US009558280B1

(12) United States Patent
Pattan et al.

(10) Patent No.: US 9,558,280 B1
(45) Date of Patent: Jan. 31, 2017

(54) METHODS, APPARATUSES AND COMPUTER-READABLE MEDIA FOR ANNOTATING ADS WITH LOCATION TAGS

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 168 days.

(21) Appl. No.: 13/313,917

(22) Filed: Dec. 7, 2011

(51) Int. Cl.
*G06F 17/30* (2006.01)
(52) U.S. Cl.
CPC .................. *G06F 17/3087* (2013.01)
(58) Field of Classification Search
CPC ............. G06F 17/30525; G06F 17/30867; G06F 17/30864; G06F 17/3087; G06F 17/30828; G06F 17/3089
USPC ............. 707/711, 748, 754; 705/14.49
See application file for complete search history.

(56) References Cited

U.S. PATENT DOCUMENTS

| 2008/0294503 A1* | 11/2008 | Borislow et al. ............ 705/10 |
| 2009/0199107 A1* | 8/2009 | Lewis et al. ............ 715/745 |
| 2010/0217670 A1 | 8/2010 | Reis et al. |
| 2010/0332330 A1 | 12/2010 | Goel et al. |
| 2012/0047129 A1* | 2/2012 | Redstone et al. ............ 707/723 |
| 2012/0158501 A1* | 6/2012 | Zhang et al. ............ 705/14.53 |
| 2012/0232998 A1* | 9/2012 | Schoen ............ 705/14.66 |

OTHER PUBLICATIONS

Iyengar, Raghuram, Sangman Han, and Sunil Gupta. "Do friends influence purchases in a social network?." Harvard Business School Marketing Unit Working Paper 09-123 (2009).*
Zeng, Fue, Li Huang, and Wenyu Dou. "Social factors in user perceptions and responses to advertising in online social networking communities." Journal of interactive advertising 10.1 (2009): 1-13.*

* cited by examiner

*Primary Examiner* — Nan Hutton
(74) *Attorney, Agent, or Firm* — Fish & Richardson P.C.

(57) ABSTRACT

When a contact of a user tags a location, a posted comment, or a shared item, the location tag may be used to boost ad scores and/or annotate content such as advertisements. The location tag may be used to annotate ads to indicate that the contact has tagged a location associated with the ad. Persons other than contacts of the user may also tag and have their location tags be counted in annotations as well. Advertisers may specify locations that are associated with their ads. Location tags may be stored in a table, and used by an ads server to boost scores of ads that have been location tagged. An annotation server may also use location tags to construct annotations that are sent to a client device operated by the user. The annotations may be based on one or more location tags made by one or more users.

54 Claims, 11 Drawing Sheets

FIG. 6    LOCATION RECORD TABLE

| User ID | Tagging Location | Timestamp | URL |
|---|---|---|---|
| Alice | The Mall | timestamp4 | URL3 |
| Bob | ABC Market | timestamp2 | URL2 |
| Alice | Gym | timestamp6 | URL1 |
| Carol | ABC Market | timestamp8 | URL4 |

FIG. 7

ENTITY ID TABLE

| Ad ID | Entity ID |
|---|---|
| Ad4 | Best Food Shop |
| Ad2 | Birdy Birds App |
| Ad1 | Virtual Bowling App |
| Ad5 | Best Food Shop |
| Ad1 | Best Food Shop |

FIG. 8    AD LOCATION TABLE

| Ad ID | Tagging Location |
|-------|------------------|
| Ad4   | ABC Market       |
| Ad2   | Gym              |
| Ad1   | Coffee Shop      |
| Ad5   | ABC Market       |
| Ad1   | The Mall         |

FIG. 9      SOCIAL GRAPH TABLE

| Name | Contact | Contact | Contact | Contact |
|---|---|---|---|---|
| Bob | Alice | Carol | David | (empty) |
| Nancy | John | David | Oscar | Paul |
| Carol | Cindy | Joe | Bob | Nancy |
| Jill | Jennifer | Mary | (empty) | (empty) |
| Alice | Mindy | Paul | Bob | Susan |

METHODS, APPARATUSES AND COMPUTER-READABLE MEDIA FOR ANNOTATING ADS WITH LOCATION TAGS

FIELD OF ENDEAVOR

Aspects of the present invention relate to methods, apparatuses, and computer-readable media to serve social annotations and improve the relevance of content being served to users. Aspects of the invention are useful in a variety of applications, including providing ads that are more relevant and meaningful to users. Specifically, aspects of the present invention relate to storing location tags made by a user's contacts and annotating ads that are served to the user with the location tags.

BACKGROUND

Internet-based advertising has had varying degrees of success. Advertising such as banner ads may be shown to visitors to a webpage. Banner ads, however, are sometimes ineffective. Ad viewers may ignore the banner ads because the ads are usually not tailored to appeal to the user. Ad viewers might not feel that the ad sends a message that is relevant to them. Because the message of the ad is not considered relevant by ad viewers, the ad suffers from a lower click-through rate. Ad viewers miss an opportunity to obtain a valuable service or product, and the advertiser loses a valuable opportunity to gain a customer.

As recognized by the inventors, increasing the relevance of the overall message conveyed by the ad is desired. In one approach, the content of a webpage that a user is viewing is used to choose an ad for a user. However, the message of the ad is still not tailored to appeal to the user. Such an approach only addresses the interests of the user at the moment that the user is viewing the webpage, and may not appeal strongly to the user. In light of such drawbacks, a better approach to delivering an advertising message that more strongly appeals to the user is desired.

SUMMARY

In one aspect of the present invention, the invention includes a method performed by a data apparatus, including: receiving, from a client device operated by a user, a request for a content item; in response to the request, selecting a particular content item to be sent to the client device; determining one or more designated geographic locations for the selected content item; determining one or more contacts of the user, the determined one or more contacts being members of a social network of the user; determining at least one location record corresponding to a tagging action of one of the user's contacts at the determined one or more designated geographic locations for the selected particular content item, wherein the tagging action marks an association of a person with a particular geographic location; constructing an annotation for the particular content item that identifies the user's contact with the tagging action corresponding to the at least one location record; and sending the annotation to the client device.

In a further aspect of the present invention, the method further includes accessing a database to determine the one or more designated geographic locations after accessing the database to determine the one or more contacts of the user.

In a further aspect of the present invention, the method further includes accessing a database to determine the one or more designated geographic locations before accessing the database to determine the one or more contacts of the user.

In a further aspect of the present invention, the method further includes receiving a location tag, wherein the location tag includes the tagging action and a user ID of the person making the tagging action; and storing a location record with data representing the location tag in a database.

In a further aspect of the present invention, the method further includes wherein the location record indicates a tagging action.

In a further aspect of the present invention, the method further includes wherein the location record indicates that the person has tagged a shared content item, wherein the shared content item is an item that the person has shared with one or more people.

In a further aspect of the present invention, the method further includes wherein the shared content item is an ad.

In a further aspect of the present invention, the method further includes wherein the location record indicates that the person has tagged a posted comment, wherein the posted comment is a comment posted online.

In a further aspect of the present invention, the method further includes determining that a timestamp associated with a location record has not exceeded a certain time period; and sending, to the client device, the annotation with an indication of time based on the timestamp.

In a further aspect of the present invention, the method further includes: selecting an ad based on a count of location records of the user's contacts associated with the ad from a database; and sending the ad to the client device.

In a further aspect of the present invention, the method further includes: increasing an ad score for an ad based on a count of location records of the user's contacts associated with the ad from a database; and selecting the ad to be sent to the client device based on the increased ad score.

In a further aspect of the present invention, the method further includes wherein an ad score for an ad is increased based on a count of a number of the user's contacts that has checked in at a location associated with the location tag; and wherein constructing the annotation for the particular content item further includes constructing the annotation to indicate the count of the number of the user's contacts that have checked in at the location.

In a further aspect of the present invention, the method further includes: maintaining an index for a table of location records based on user IDs and tagging locations; and wherein accessing a database is performed using the index to access the table.

In a further aspect of the present invention, the method further includes: using a cron job to crawl websites or other sources of location tag information to obtain location tag information; and populating a database using the location tag information.

In a further aspect of the present invention, the method further includes wherein the location record indicates a tagging action in which the person has checked in at a location.

In a further aspect of the present invention, the method further includes wherein the location record contains a URL for a photo.

In a further aspect of the present invention, the method further includes wherein the location record contains a URL for conversion data, and the location record indicates that the person has performed a conversion event.

In a further aspect of the present invention, the invention includes an apparatus, including: one or more processors, a computer-readable medium coupled to the one or more processors having instructions stored thereon that, when executed by the one or more processors, cause the one or more processors to perform operations including: receiving, from a client device operated by a user, a request for a content item; in response to the request, selecting a particular content item to be sent to the client device; determining one or more designated geographic locations for the selected content item; determining one or more contacts of the user, the determined one or more contacts being members of a social network of the user; determining at least one location record corresponding to a tagging action of one of the user's contacts at the determined one or more designated geographic locations for the selected particular content item, wherein the tagging action marks an association of a person with a particular geographic location; constructing an annotation for the particular content item that identifies the user's contact with the tagging action corresponding to the at least one location record; and sending the annotation to the client device.

In a further aspect of the present invention, the computer-readable medium coupled to the one or more processors of the apparatus has further instructions stored thereon that, when executed by the one or more processors, cause the one or more processors to perform operations further including: accessing a database to determine the one or more designated geographic locations after accessing the database to determine the one or more contacts of the user.

In a further aspect of the present invention, the computer-readable medium coupled to the one or more processors of the apparatus has further instructions stored thereon that, when executed by the one or more processors, cause the one or more processors to perform operations further including: accessing a database to determine the one or more designated geographic locations before accessing the database to determine the one or more contacts of the user.

In a further aspect of the present invention, the computer-readable medium coupled to the one or more processors of the apparatus has further instructions stored thereon that, when executed by the one or more processors, cause the one or more processors to perform operations further including: receiving a location tag, wherein the location tag includes the tagging action and a user ID of the person making the tagging action; and storing a location record with data representing the location tag in a database.

In a further aspect of the present invention, the apparatus further includes wherein the location record indicates a tagging action.

In a further aspect of the present invention, the apparatus further includes wherein the location record indicates that the person has tagged a shared content item, wherein the shared content item is an item that the person has shared with one or more people.

In a further aspect of the present invention, the apparatus further includes wherein the shared content item is an ad.

In a further aspect of the present invention, the apparatus further includes wherein the location record indicates that the person has tagged a posted comment, wherein the posted comment is a comment posted online.

In a further aspect of the present invention, the apparatus further includes wherein the computer-readable medium coupled to the one or more processors has further instructions stored thereon that, when executed by the one or more processors, cause the one or more processors to perform operations further including: determining that a timestamp associated with a location record has not exceeded a certain time period; and sending, to the client device, the annotation with an indication of time based on the timestamp.

In a further aspect of the present invention, the apparatus further includes wherein the computer-readable medium coupled to the one or more processors has further instructions stored thereon that, when executed by the one or more processors, cause the one or more processors to perform operations further including: selecting an ad based on a count of location records of the user's contacts associated with the ad from a database; and sending the ad to the client device.

In a further aspect of the present invention, the apparatus further includes wherein the computer-readable medium coupled to the one or more processors has further instructions stored thereon that, when executed by the one or more processors, cause the one or more processors to perform operations further including: increasing an ad score for an ad based on a count of location records of the user's contacts associated with the ad from a database; and selecting the ad to be sent to the client device based on the increased ad score. In a further aspect of the present invention, the apparatus further includes wherein an ad score for an ad is increased based on a count of a number of the user's contacts that has checked in at a location associated with the location tag; and wherein the instructions for constructing the annotation for the particular content item further includes instructions for constructing the annotation to indicate the count of the number of the user's contacts that have checked in at the location.

In a further aspect of the present invention, the apparatus further includes wherein the computer-readable medium coupled to the one or more processors has further instructions stored thereon that, when executed by the one or more processors, cause the one or more processors to perform operations further including: maintaining an index for a table of location records based on user IDs and tagging locations; and wherein accessing a database is performed using the index to access the table.

In a further aspect of the present invention, the apparatus further includes wherein the computer-readable medium coupled to the one or more processors has further instructions stored thereon that, when executed by the one or more processors, cause the one or more processors to perform operations further including: using a cron job to crawl websites or other sources of location tag information to obtain location tag information; and populating a database using the location tag information.

In a further aspect of the present invention, the apparatus further includes wherein the location record indicates a tagging action in which the person has checked in at a location.

In a further aspect of the present invention, the apparatus further includes wherein the location record contains a URL for a photo.

In a further aspect of the present invention, the apparatus further includes wherein the location record contains a URL for conversion data, and the location record indicates that the person has performed a conversion event.

In a further aspect of the present invention, the invention includes a computer-readable medium coupled to one or more processors having instructions stored thereon that, when executed by the one or more processors, cause the one or more processors to perform operations including: receiving, from a client device operated by a user, a request for a content item; in response to the request, selecting a particular content item to be sent to the client device; determining one or more designated geographic locations for the selected content item; determining one or more contacts of the user, the determined one or more contacts being members of a social network of the user; determining at least one location record corresponding to a tagging action of one of the user's contacts at the determined one or more designated geographic locations for the selected particular content item, wherein the tagging action marks an association of a person with a particular geographic location; constructing an annotation for the particular content item that identifies the user's contact with the tagging action corresponding to the at least one location record; and sending the annotation to the client device.

In a further aspect of the present invention, the computer-readable medium coupled to the one or more processors has further instructions stored thereon that, when executed by the one or more processors, cause the one or more processors to perform operations further including: accessing a database to determine the one or more designated geographic locations after accessing the database to determine the one or more contacts of the user.

In a further aspect of the present invention, the computer-readable medium coupled to the one or more processors has further instructions stored thereon that, when executed by the one or more processors, cause the one or more processors to perform operations further including: accessing a database to determine the one or more designated geographic locations before accessing the database to determine the one or more contacts of the user.

In a further aspect of the present invention, the computer-readable medium coupled to the one or more processors has further instructions stored thereon that, when executed by the one or more processors, cause the one or more processors to perform operations further including: receiving a location tag, wherein the location tag includes the tagging action and a user ID of the person making the tagging action; and storing a location record with data representing the location tag in a database.

In a further aspect of the present invention, the computer-readable medium further includes wherein the location record indicates a tagging action.

In a further aspect of the present invention, the computer-readable medium further includes wherein the location record indicates that the person has tagged a shared content item, wherein the shared content item is an item that the person has shared with one or more people.

In a further aspect of the present invention, the computer-readable medium further includes wherein the shared content item is an ad.

In a further aspect of the present invention, the computer-readable medium further includes wherein the location record indicates that the person has tagged a posted comment, wherein the posted comment is a comment posted online.

In a further aspect of the present invention, the computer-readable medium coupled to the one or more processors has further instructions stored thereon that, when executed by the one or more processors, cause the one or more processors to perform operations further including: determining that a timestamp associated with a location record has not exceeded a certain time period; and sending, to the client device, the annotation with an indication of time based on the timestamp.

In a further aspect of the present invention, the computer-readable medium further includes wherein the computer-readable medium coupled to the one or more processors has further instructions stored thereon that, when executed by the one or more processors, cause the one or more processors to perform operations further including: selecting an ad based on a count of location records of the user's contacts associated with the ad from a database; and sending the ad to the client device.

In a further aspect of the present invention, the computer-readable medium further includes wherein the computer-readable medium coupled to the one or more processors has further instructions stored thereon that, when executed by the one or more processors, cause the one or more processors to perform operations further including: increasing an ad score for an ad based on a count of location records of the user's contacts associated with the ad from a database; and selecting the ad to be sent to the client device based on the increased ad score.

In a further aspect of the present invention, the computer-readable medium further includes wherein an ad score for an ad is increased based on a count of a number of the user's contacts that has checked in at a location associated with the location tag; and wherein the instructions for constructing the annotation for the particular content item further includes instructions for constructing the annotation to indicate the count of the number of the user's contacts that have checked in at the location.

In a further aspect of the present invention, the computer-readable medium further includes wherein the computer-readable medium coupled to the one or more processors has further instructions stored thereon that, when executed by the one or more processors, cause the one or more processors to perform operations further including: maintaining an index for a table of location records based on user IDs and tagging locations; and wherein accessing a database is performed using the index to access the table.

In a further aspect of the present invention, the computer-readable medium further includes wherein the computer-readable medium coupled to the one or more processors has further instructions stored thereon that, when executed by the one or more processors, cause the one or more processors to perform operations further including: using a cron job to crawl websites or other sources of location tag information to obtain location tag information; and populating a database using the location tag information.

In a further aspect of the present invention, the computer-readable medium further includes wherein the location record indicates a tagging action in which the person has checked in at a location.

In a further aspect of the present invention, the computer-readable medium further includes wherein the location record contains a URL for a photo.

In a further aspect of the present invention, the computer-readable medium further includes wherein the location record contains a URL for conversion data, and the location record indicates that the person has performed a conversion event.

Further scope of applicability of the methods, apparatuses, and computer-readable storage mediums discussed will become apparent from the detailed description given hereinafter. However, it should be understood that the detailed description and specific examples, while indicating embodiments, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein:

FIG. 6 illustrates a location record table, according to an embodiment.

FIG. 7 illustrates an entity ID table, according to an embodiment.

FIG. 8 illustrates an ad location table, according to an embodiment.

FIG. 9 illustrates a social graph table, according to an embodiment.

Figure 1:
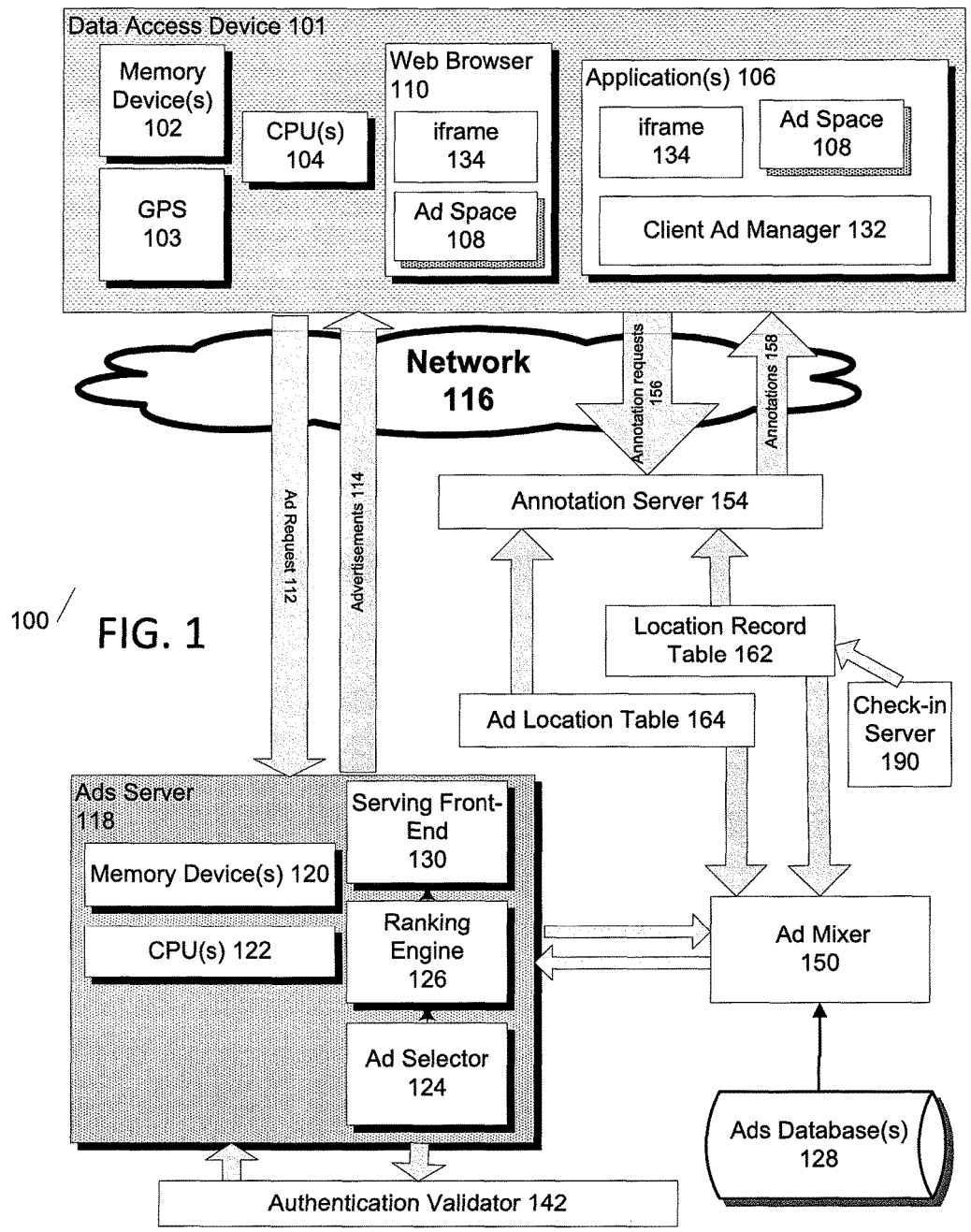
FIG. 1 is a block diagram illustrating a social annotation system in which location tags made by a user's contacts are used to annotate ads, according to an embodiment.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Introduction

An ad displayed to a user on a device may be presented with an annotation. The annotation may be a message that indicates that one or more identified people have "checked in" at some particular location or "tagged" a posted comment with a particular location or tagged a shared item with a particular location. The people may be "contacts" of the user. A "contact" is a person that is a social contact in the social graph of the user. A social contact is an acquaintance of the user, and the user's social contacts may be recorded in a table in a storage.

A contact "checks in" at a geographic location (or "tags" a geographic location) when the contact operates a check-in control on the contact's device. The location indicated by a location tag may be called a "tagging location". For example, Alice may check in at a coffee shop using her mobile device or her laptop. The check-in tagging action may be performed through a social networking service or some other website or software application. A "tagging action" may include any act that associates a location with a user, a photo, a comment, or anything else. A user may perform a tagging action in order to create a location tag. By checking in, Alice is informing anyone who is socially connected to Alice that Alice is at the coffee shop. The social connections may be formed or defined online on the Internet.

The annotations may be written over, embedded, or included within the ad. The annotations may be of the form social contact(s)+"has checked in at"+location. The annotation indicates the check-in made by the social contact(s). For example, an annotation may be "Alice has checked in at ABC Market", where "Alice" is the name of a social contact of the user, and "ABC Market" is the location where Alice checked in at. More than one social contact may be shown in the annotation. For example, the annotation may display as "Alice, Jill, and Bob have checked in here". As another example, an annotation may be "100 people have checked in here." In some embodiments, an image that is a photo or avatar of the social contact may be displayed with the annotation. In some embodiments, photos or avatars may be displayed in place of the names.

A contact may also tag a posted comment (also referred to as "tagging a posting") or a shared item with a location. In an embodiment, the contact may tag any comment that the contact has posted on a website that allows for such tagging actions.

In some embodiments, the contact may tag comments that others have posted. In an embodiment, the contact may also tag an item that the contact has shared with others, such as photos, videos, ads, or any other item that the contact has shared with others. Tagging a shared item is also another example of a tagging action.

By tagging a posted comment or a shared item, the contact indicates a location (e.g. geographic location) associated with the posted comment or the shared item. For example, Alice may post a comment such as "I am eating great food". Alice may then tag the post with a location such as "ABC Restaurant". By tagging the comment, Alice associates ABC restaurant location with the post. Each occurrence of a check-in at a location, tagging of a shared item, or tagging of a posted comment is sometimes referred to herein as a "location tag". In some embodiments, the contact may also tag an item that other people have shared with others.

An annotation constructed using a tagged posting or a tagged shared item may be presented to a user. For example, such an annotation may display as "Alice said about ABC Restaurant on Tuesday: I am eating great food" in an ad for ABC Market.

An annotation may also display a photo that a user has taken at a particular location or some other graphic that a user associates with the particular location. For example, Alice might take a photo of a museum. Alice tags the photo with the location of the museum. An annotation may be a display of a photo of the museum for a search result or ad featuring the museum.

An annotation may also display a location where a user has performed a conversion (e.g., purchased a product). For example, Alice may purchase a car, and the details of the car purchase may be displayed when an ad is served for the dealership where the car was purchased. Such an annotation may display as "Alice purchased Brand X car at Y dealership last week! Click here to see the different cars that are available at Y dealership now". The conversions may be any type of conversions, including, for example, purchase of downloadable products online, purchases of services, or signing up for a service. Any type of conversion may be associated with a location and that conversion and location information may be used for the annotation.

In some embodiments, an annotation can be shown for any URL or entity (in addition to ads). For example, the disclosed techniques can be applied to annotate search results or products in a product listing page. Such an annotation may display, for example, as "Alice has checked in here" for a search result in a search results page or for a displayed product with an associated store that sells the product.

Because the ad is annotated using the name(s) of one or more social contacts of the user, the message of the ad with the annotations, as a whole, more strongly appeals to the user. The display of contact's names indicating that the contact or other people have checked in or tagged a location associated with the ad increases the relevance of the ad and annotation combination to the user. The annotations are constructed and served to applications and web browsers by a social annotation system such as the social annotation system described with respect to FIG. 1 below.

Structural Overview

FIG. 1 is a block diagram illustrating a social annotation system 100 in which location tags made by a user's contacts may be used to annotate ads, according to an embodiment. The annotations may be served to an application or a web browser, in response to a request for an ad from the application or the web browser. FIG. 1 illustrates modules of social annotation system 100 and some of the communications sent between the modules when an ad request is received from an application or from a web browser.

An embodiment of a mobile data access device 101 which is operated by the user may include a mobile telephone, a mobile handheld device, a media tablet device, netbook, notebook computer, GPS device, media player device, or some combination thereof or variation thereof. Mobile data access device 101 is hereafter referred to as "client" 101.

Client 101 may include one or more memory devices 102 for storing applications, application data, webpages, images, audio and/or video, device settings and/or preferences, and other information relevant to the operation, use, and potential user(s) of the device. Client 101 may also include one or more processors 104 to process the information and execute the applications stored in the memory device(s) 102. Variations of memory 102 and processor 104 devices may include magnetic, electronic, and/or optical devices and/or combinations thereof.

Some variations of client 101 may include a display screen (not shown) and/or a speaker (not shown). Other variations of a client may include signal output paths such as wired or wireless connections to external audio and/or video devices such as docking stations, earphones, near field communication devices, external displays, and/or other similar information presentation devices. Client 101 may also include a global positioning system (GPS) unit 103. The GPS unit 103 allows various applications and modules executing on client 101 to obtain data indicating the physical location, or an approximate location, of the user. Other ways of determining the physical location of the user may include examining the IP address assigned to client 101 and cell phone tower triangulation. Further, in some embodiments, when a user checks in, a near field communication module on client 101 may communicate with other near field communication modules located in the environment surrounding the user, which may establish the physical location of client 101. Although at any given moment a user may be separated from a client device by a distance, for the purposes of the specification, the location of the client device and the user operating the client device may be considered to be the same.

Client 101 may include one or more applications 106. Some variations of applications 106 may include designated ad space 108 for the display of advertisements related to an application or the content/information presented or processed therein. Client 101 may also include one or more web browser tools 110 for viewing and interacting with webpages via a wired or wireless internet connection and/or via a mobile data exchange connection such as cellular, optical, near field communication, or some combination thereof. Some variations of a web browser 110 may also include a designated ad space 108 for the display of advertisements related to webpage content, search results, web-based email, map information, and/or geo-temporal factors. In some embodiments, the web browser 110 is an application that is one example of application 106. In such embodiments, web browser 110 operates in a manner similar to other applications with respect to various embodiments of the invention.

Client 101 may submit advertisement requests 112 and receive served advertisements 114 via a communication network 116 such as the internet, a public, private, wired, and/or wireless local area network (LAN) or wide area network (WAN), a cellular communication network, telephone lines, radio-frequency networks, hard-wired connections, and/or combinations thereof. The ad requests 112 and served advertisements 114 may go to and from an ads server 118. In some embodiments, the ad requests 112 may include encrypted identification information. The encrypted identification information may be a limited ID cookie containing an encrypted unique identifier for the user. In some embodiments, the encrypted identification information may also be any other type of cookie containing an encrypted unique identifier for the user. In yet other embodiments, the encrypted identification information may be an identifier that is encrypted. In some embodiments, the advertisements 114 may include annotations which are sent to client 101 for display. In some embodiments, the served ads 114 are sent over HTTP and the annotations are served over a secure HTTP connection (HTTPS).

An embodiment of an ads server 118 may be equipped with one or more memory devices 120 for storing information and one or more processors 122 for performing data processing operations. The embodiment shown is also equipped with an ad selector 124 and an optional ranking engine 126 that selects and optionally ranks ads from an ads database 128, and a serving frontend 130 that delivers the advertisement via network 116 to client 101.

In some embodiments, a client ad manager 132 may be compiled with the application 106 and become embedded within application 106. Client ad manager 132 thus may form an integral part of application 106. The client ad manager 132 manages advertising for application(s) 106, including sending requests for advertisements to ads server 118 and receiving ads from ads server 118. In other embodiments, client ad manager 132 may not be part of application 106, and may be part of web browser 110, or may be a separate module or component of client 101. In some embodiments, client ad manager 132 also manages advertising for web browser 110.

In some embodiments, application(s) 106 and/or web browser 110 includes an iframe 134 executing content sent from ads server 118. The iframes depicted in FIG. 1 form part of an embodiment in which ads server 118 sends iframe content to client 101 in response to an ad request. The iframe 134 requests annotations and receives annotations for display to the user.

Ads server 118 may send the encrypted identification information to an authentication validator 142 to obtain user IDs. In an embodiment, a user ID is a unique value that identifies a user or a social contact in a social network. For example, the user ID may be a long integer. The user ID may be the social networking ID of the user or social contact. No two users or social contacts may have the same user ID.

One such example of encrypted identification information is the limited ID cookie. The limited ID cookie is a cookie, which in some embodiments may be created by a limited ID cookie generator server, that contains an encrypted social networking ID (such as the user ID) from the user's social networking account. Each limited ID cookie is an encrypted cookie containing user ID data. Client 101 may store a copy of limited ID cookie received from a limited ID cookie generator server (not depicted in FIG. 1). The limited ID cookie is considered "weak" because the limited ID cookie cannot be decrypted by other third party services or applications and can be used only for serving social ads. In some embodiments, the limited ID cookie may be used to keep track of user presence in social networks. The limited ID cookie may also include a timestamp and have a limited lifetime.

In some embodiments, as a security measure, only a specially designated server, authentication validator 142, may decrypt the limited ID cookie and retrieve the user ID that is stored inside the limited ID cookie. If an unauthorized party gains access to the limited ID cookie, the potential harm to the user is limited to serving social ads using the social networking ID. Through the use of the limited ID cookies, the use of a more generalized, identification cookie that may allow for all types of access and transactions for the user is unnecessary for serving annotations. Thus, the user need not expose other more powerful social networking identification cookies, and because the limited ID cookie is only useful for serving social ads and may expire, the damage that may occur due to unauthorized access of the limited ID cookie is limited.

An embodiment may include an ad mixer 150 that selects an ad to send to ads server 118. In some embodiments, ad mixer 150 may be part of ads server 118. In some embodiments, the functions of ad mixer 150 may be implemented within ranking engine 126 and/or ad selector 124. In some embodiments, ad mixer 150 retrieves records from a location record table 162 and an ad location table 164 to boost ads in ads scoring. In some embodiments, the ad that ad mixer 150 selects for sending to ads server 118 may be affected by information retrieved from the location record table 162 and ad location table 164.

An embodiment may also include authentication validator 142. In some embodiments, ad server 119 may send encrypted identification information to authentication validator 142, and receive a user ID from authentication validator 142. In some embodiments, the encrypted identification information is a limited ID cookie. Authentication validator 142 decrypts the encrypted identification information and provides the user ID that is stored in the encrypted identification information to ads server 118. In some embodiments, authentication validator 142 decrypts the encrypted identification information and provides the user ID that is stored in the encrypted identification information to any module or other requester that requests the user ID.

An embodiment may also include an annotation server 154. Annotation server 154 constructs and serves annotations to client 101. When ads server 118 receives a request from client 101, in an embodiment, ads server 118 sends an ad and iframe content to client 101. The iframe content is installed on client 101, on the application or web browser that requested the ad. Iframe 134 sends annotation requests 156 to annotation server 154. Annotation server 154 retrieves records from the location record table 162 and ad location table 164 to construct annotations 158 that are sent to client 101.

An embodiment may also include a check-in server 190. The check-in server allows the user to check in at a location. In some embodiments, the check-in server may also allow the user to tag a comment or a posting with a location.

An embodiment may also include a location record table 162. The location record table may have three columns, which are user ID column, a tagging location column, and a timestamp column. The location record table may store location tags that the user makes while at some location. For example, if the user is in Hawaii, the user may tag the Hawaii location that she is at. Information about the location tag would then be stored in location record table 162. The rows of the location record table may be used in conjunction with the rows of the ad location table in order to construct annotations.

An embodiment may also include an ad location table 164. The ad location table may have two columns. One column may contain an ad ID. The other column may contain a tagging location. Data for populating the ad location table may be provided by an advertiser. The rows of the ad location table may be used in conjunction with the rows of the location record table in order to construct annotations.

Some modules or communications that may be present in the embodiments of FIG. 1 are not depicted in the figures for simplicity of illustration. For example, one or more cron jobs are not depicted in the figures.

Functional Overview

In an embodiment, in social annotation system 100, location records are created when a contact checks in at a location, or when a contact tags a posted comment or a shared item. The location records may be used to boost ad scores. Information from the location records may also be used for annotating ads that are sent to the client device in response to an ad request. An annotation may indicate that one or more persons, including contacts, have made location tags at the tagging location.

The terms "advertisement" and "ad" are interchangeable as used in the present patent specification. The terms "identification" and "ID" are interchangeable as used in the present patent specification. Names of users may be depicted in the figures instead of the user IDs for simplicity of illustration.

Storing Tag Information after a User Makes a Location Tag

Figure 2:
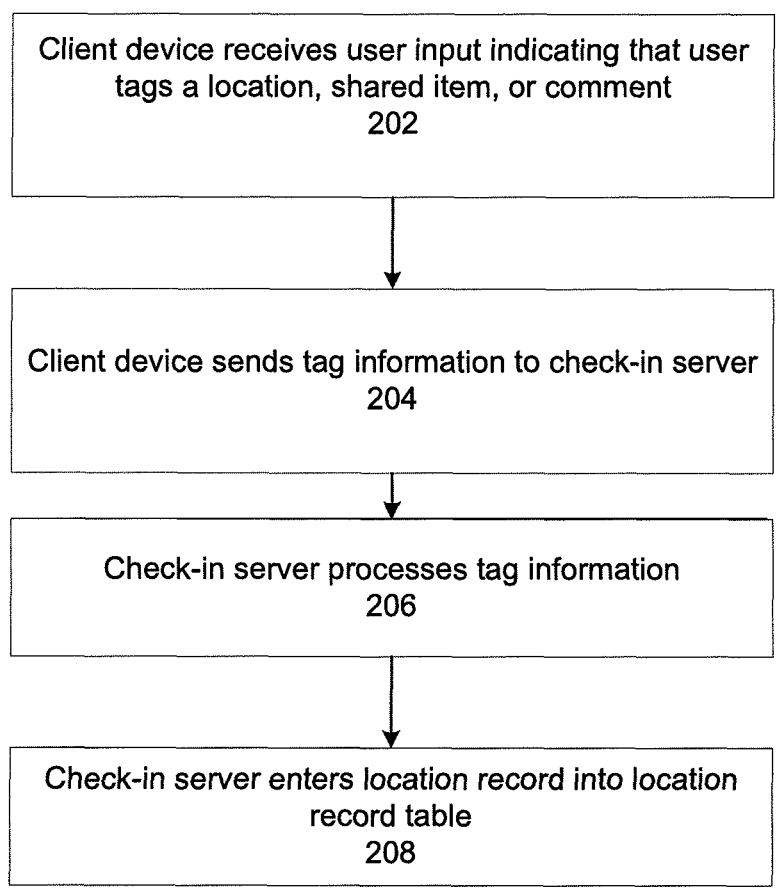
FIG. 2 is a flow diagram illustrating storing location tags made by a contact, according to an embodiment.

FIG. 2 is a flow diagram illustrating storing location tags made by a contact, according to an embodiment.

In step 202, the client device receives user input indicating that user tags a location, shared item, or comment. The client device may be any kind of device that allows tagging. The user may tag her location wherever she may be. For example, the user may be at a store or a café. The user may use any conventional technique to perform the check-in. The user may be operating a device that includes near field communication capabilities. The near field communication capabilities may allow the device to communicate with other devices in order to perform the check-in. At the same time, the location of the user may be determined from the near field communication.

Embodiments of the invention are not limited to any particular methods or tagging techniques that may be used to perform the check-in. The user may tag her location at the café, for example. The user may also tag an item that she has shared with a location. For example, the user may share a photo with her friend. After sharing a photo, the user may add a location to the photo in order to tag the photo. In some embodiments, the photo may be tagged by a GPS module within the camera that took the photo. As another example, the user may post a comment on a website. She then adds a location to her comment in order to tag the comment. She may also add a location to a comment made by a friend. In these examples, by adding the location to any one of the photo, the comment on the website, or the comment made by a friend, she is adding a location tag to the photo, website, or friend's comment, respectively.

In step 204, the client device sends the tag information to check-in server 190. After receiving the user input, the client device sends the tag information to the check-in server. The tag information may be sent over the network. The tag information may include location information, such as the current location of the client device 101. The current location of the client device 101 may be determined by examining the IP address assigned to the device, performing cell phone tower triangulation, retrieving location information from the GPS module within the device, or retrieving data from near field communications.

In step 206, check-in server 190 processes the tag information. The check-in server 190 may process the tag information by authenticating that the tag information is from a legitimate user. The check-in server 190 may verify that the user ID is authentic by submitting a check-in cookie to authentication validator 142. The check-in server may also communicate with other servers in order to perform the check-in process. The check-in server may also verify that the location information is a valid location, and that the timestamp information is some valid timestamp.

In step 208, check-in server 190 enters a location record into location record table 162. The check-in server may create a record using the user ID, location information, and timestamp information received from the client. For example, the record may be "Alice, Palo Alto Café, timestamp3". The user ID may be, for example, Alice's user ID. Alice may be visiting Palo Alto Café at time timestamp3. The timestamp may represent date and time information such as 17:45, Dec. 5, 2011. This is an example record that is stored in the location record table. The record may be used by the annotation server, in conjunction with a record from the ad location table, in order to construct an annotation.

Providing an Annotated Ad in Response to an Ad Request

Figure 3A:
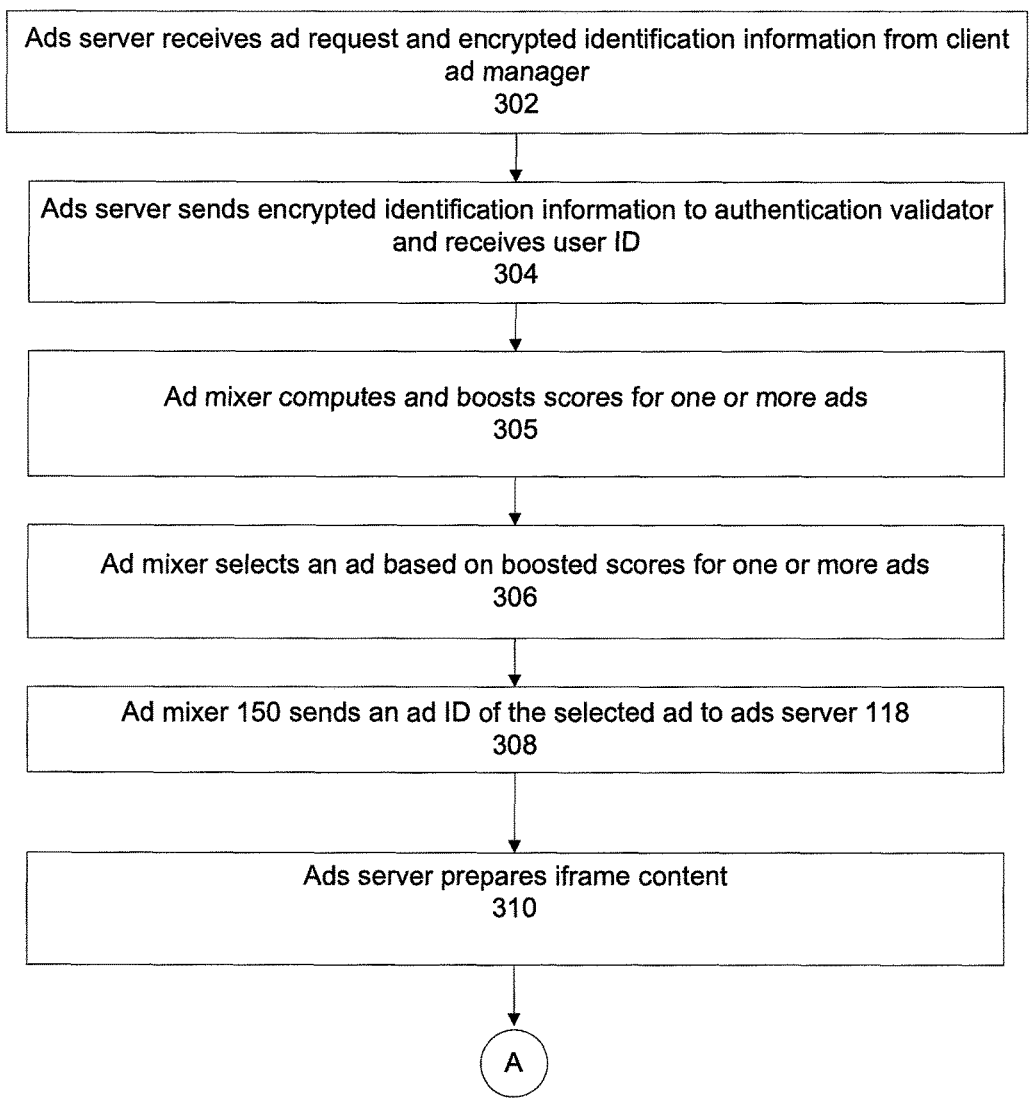
FIGS. 3a and 3b together form a flow diagram illustrating providing an annotated ad in response to an ad request, according to an embodiment.
Figure 3B:
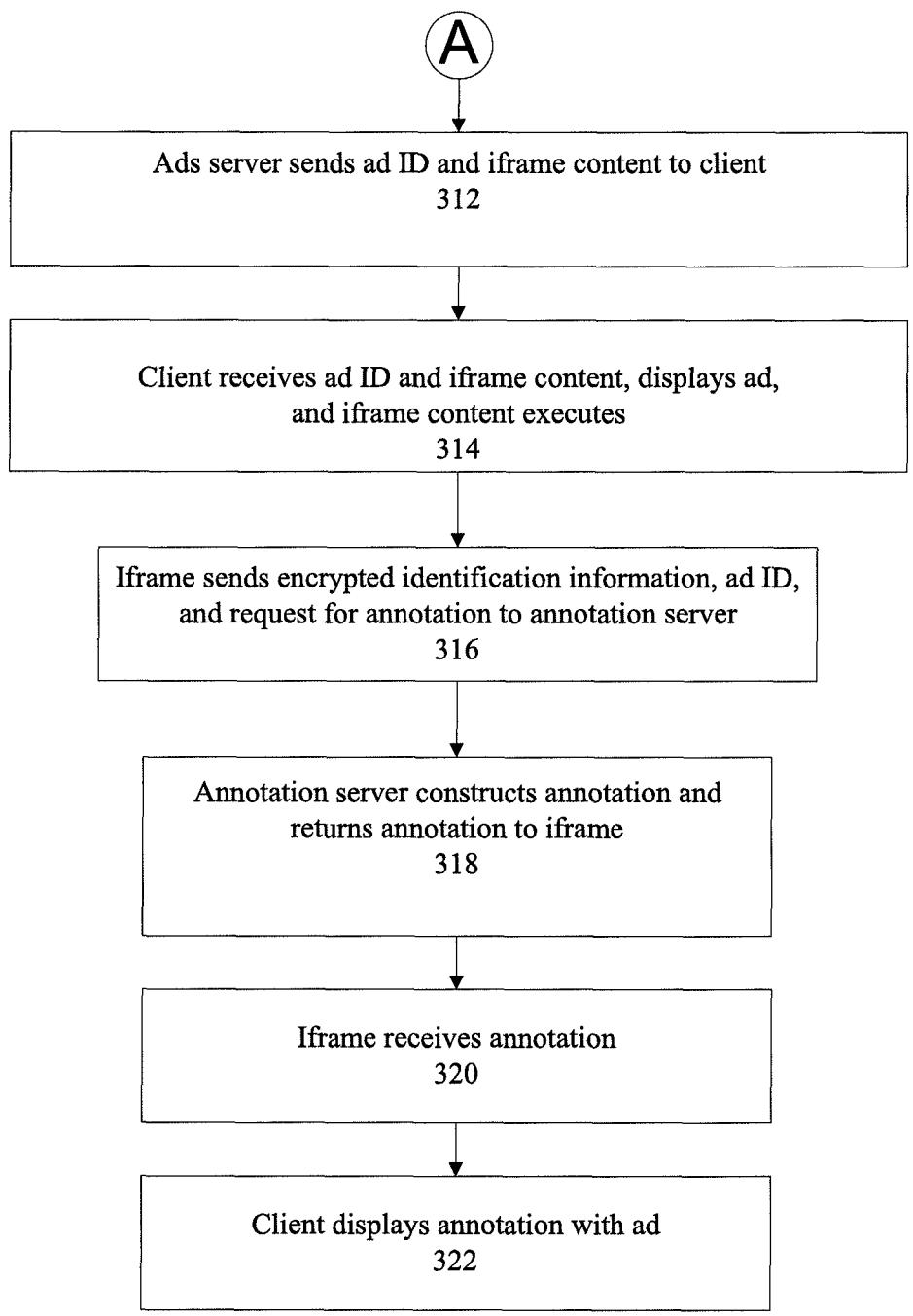

FIGS. 3a and 3b together form a flow diagram illustrating providing an annotated ad in response to an ad request, according to an embodiment.

In step 302, ads server 118 receives an ad request and encrypted identification information from client ad manager 132. In an embodiment, the encrypted identification information is a limited ID cookie. In some embodiments, the encrypted identification information is an encrypted identifier or some other type of encrypted cookie containing an identifier. Client ad manager 132 manages sending ad requests to ads server 118 and receiving ad requests from ads server 118. The limited ID cookie contains an encrypted user ID that identifies the user that will be viewing the ad received from ads server 118.

In step 304, ads server 118 sends encrypted identification information to authentication validator 142 and receives a user ID. In some embodiments, ads server 118 sends the encrypted identifier or cookie (limited ID cookie or other type of cookie) containing an encrypted identifier to the authentication validator 142. In some embodiments, authentication validator 142 is the only module with the capability to decrypt the encrypted identification information and extract the user ID. This adds a level of protection to the security of the encrypted identification information.

Figure 4:
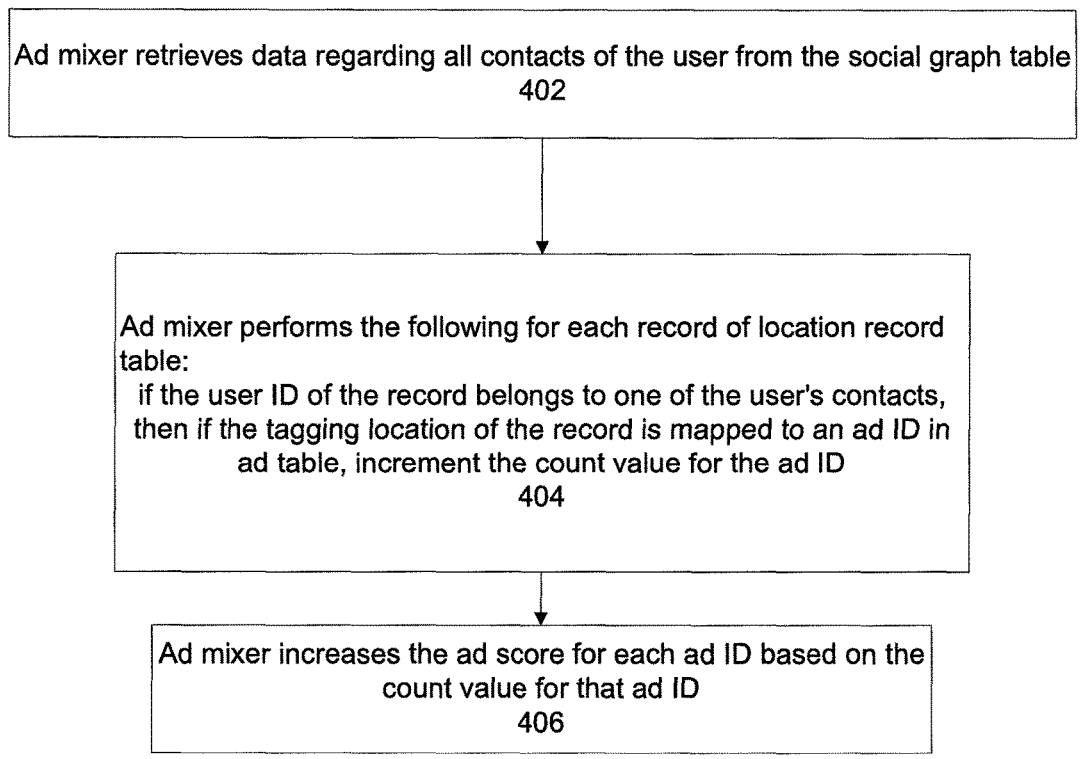
FIG. 4 is a flow diagram illustrating boosting ad scores using tag data, according to an embodiment.

In step 305, ad mixer 150 computes and boosts scores for one or more ads. In some embodiments, the scores of ads may be boosted according to the number of location tags made by contacts of the user. The boost to the ad score may be proportional to the number of location tags made by the contacts. For example, if most of Bob's contacts have been to the ABC Market, and they have all tagged their location at ABC Market, then the ads that are associated with ABC Market location tags may be boosted. FIG. 4 provides additional detail regarding step 305.

In step 306, ad mixer 150 selects an ad based on boosted scores for one or more ads. Ad mixer 150 selects the ad with highest score, after boosting scores for the ads.

In step 308, ad mixer 150 sends an ad ID of the selected ad to ads server 118.

In step 310, ads server 118 prepares iframe content. Ads server 118 may send iframe content that will be sent to client 101 for installation and execution.

In step 312, ads server 118 sends ad ID and the iframe content to client 101.

In step 314, client 101 receives ad ID and the iframe content, displays ad, and the iframe content executes within an inline frame on the client. The iframe code initializes after installation, and executes in order to send an annotation request to annotation server 154 and receive an annotation from the annotation server 154.

In step 316, iframe 134 sends encrypted identification information, ad ID, and request for annotation to annotation server 154. The encrypted identification information may be a limited ID cookie, some other type of encrypted cookie containing an identifier, or some other encrypted identifier. The iframe communicates with annotation server 154 to request an annotation and receive the annotation.

Figure 5:
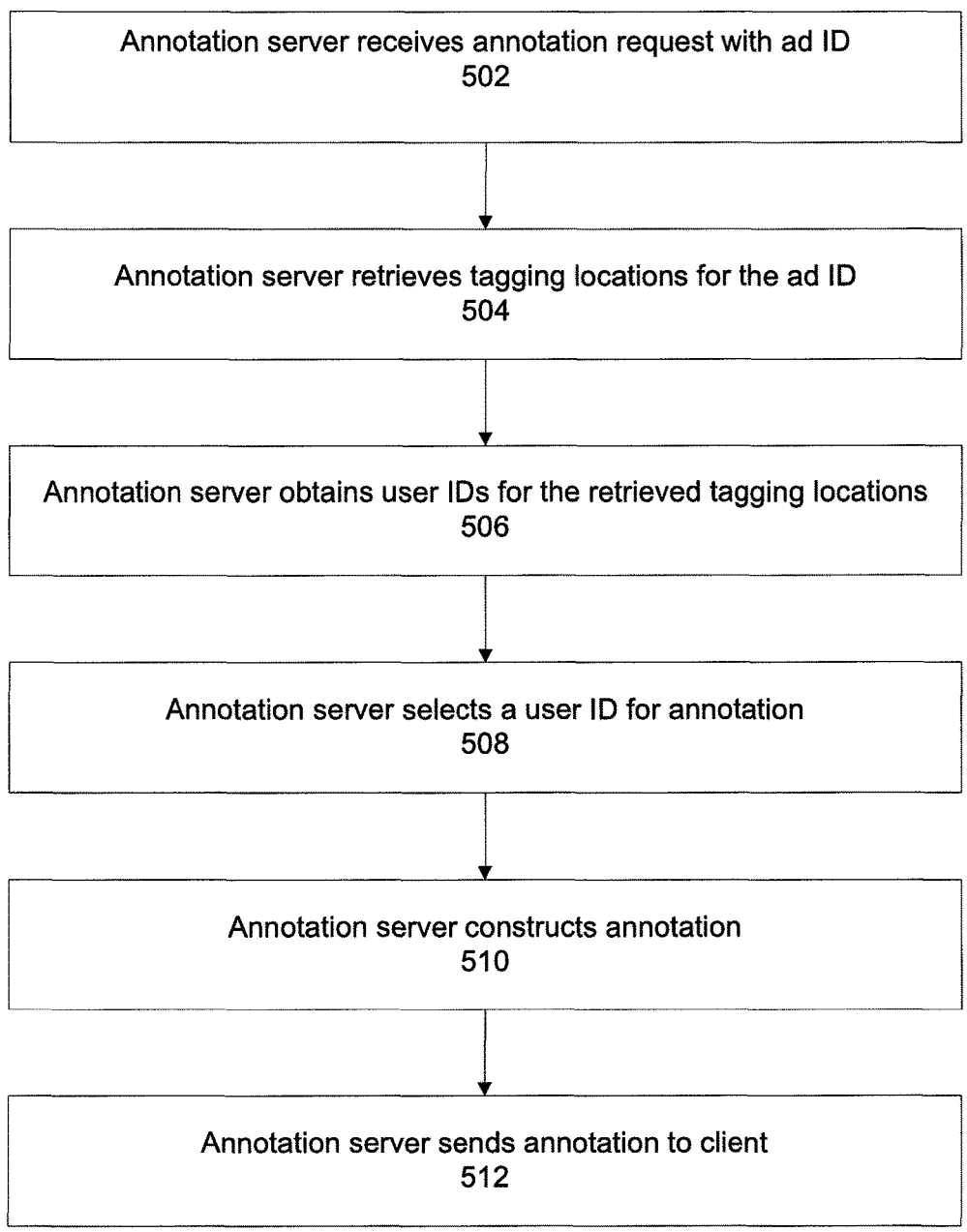
FIG. 5 is a flow diagram illustrating construction of annotation using tag data, according to an embodiment.

In step 318, annotation server 154 constructs the annotation and returns the annotation to iframe 134. The steps that annotation server 154 may perform to construct the annotation according to an embodiment are illustrated in FIG. 5.

In step 320, iframe 134 receives the annotation.

In step 322, client 101 displays annotation with ad. Client 101 may display the annotation on top of the ad, or client 101 may display the annotation by making the annotation a part of the ad.

Boosting One or More Ad Scores Using Tag Data

FIG. 4 is a flow diagram illustrating boosting ad scores using tag data, according to an embodiment. In an embodiment as described below, ad mixer 150 may increase the score of an ad based on the number of location tags made for locations associated with the ad by contacts of the user.

In an embodiment, each ad is boosted based on the number of location tags made by the user's contacts for locations that are associated with the ad. An advertiser may designate which geographic locations are associated with each ad and such information is stored in the ad location table.

In step 402, ad mixer 150 retrieves data regarding all contacts of the user from the social graph table. The contact information is retrieved for the user in order to find location tags that were made by the user's contacts. For example, according to record 902 of FIG. 9, Bob has friends that are Alice, Carol, and David. In some embodiments, in the next step, only the location records that are associated with location tags made by contacts of the user are used to boost ad scores.

In step 404, ad mixer 150 performs the following for each record of location record table 162: if the user ID of the record belongs to one of the user's contacts, then if the tagging location of the record is mapped to an ad ID in the ad location table, increment the count value for the ad ID. In other words, as long as the tagging location value of the location record is equal to the tagging location value of the ad ID record, a count value for the ad ID is incremented if the location record is for a location tag made by a contact of the user. In some embodiments, geo fences defining areas surrounding the tagging locations are used to determine if the tagging location value of the location record is equal to the tagging location value of the ad ID record. The geo fences may specify virtual boundaries or perimeters that can define geographic areas. If the tagging location value of the location record is within the perimeter of the geo fence then the location record is considered equal to the tagging location value of the ad ID record. For example, both Bob and Carol checked in at ABC Market, as shown in records 604 and 608 of FIG. 6. ABC Market is the tagging location for both Ad5 and Ad4, as shown in FIG. 8. Thus, the count value for both Ad5 and Ad4 is 2. As another example, only Alice has checked in at The Mall as indicated in record 602, and The Mall is the location for Ad1. Therefore the count value for Ad1 is 1. In an embodiment, the increase in the ad score for either Ad5 or Ad4 with a count value of 2 is greater than the increase in the ad score for Ad1, which has a count value of only 1. Based on the difference in count values, an increase in the ad score for Ad5 and Ad4 should be greater than an increase in the ad score for Ad1.

In step 406, ad mixer 150 increases the ad score for each ad ID based on the count value for that ad ID. In some embodiments, the change in the ad score is proportional to the relative increase in count value for each ad ID. For example, if the count value for Ad5 is 2 and the count value for Ad1 is 1, then the increase might be 0.4 for Ad5 and 0.2 for Ad1. A system administrator can specify the increase in ad scores as a function of the count values. The increase in the ad score of an ad increases the likelihood that ad mixer 150 will select the ad to serve to the user.

Annotation Server Constructing Annotations

FIG. 5 is a flow diagram illustrating construction of an annotation using tag data, according to an embodiment. In step 502, annotation server 154 receives an annotation request with an ad ID. Since the ad to be displayed to the user has been selected by ad mixer 150, the annotation server's task in constructing the annotation is to construct an annotation that is appropriate for the selected ad.

In step 504, annotation server 154 retrieves tagging locations for the ad ID. Annotation server 154 may search through the ad location table, looking for records with an ad ID that matches the ad ID received from the iframe. Annotation server 154 retrieves the tagging locations of such records with matching ad ID. The tagging locations may be geographic locations designated by the advertisers for each ad ID, and indicate such tagging locations (e.g. designated geographic locations) that may be used for constructing an annotation for that ad ID. For example, if the ad ID received from the iframe is Ad1, then the annotation server may retrieve "Coffee Shop" and "The Mall", as shown in record 806 and record 810 of FIG. 8. As another example, if the ad ID received is Ad4, then the annotation server may retrieve "ABC Market", as shown in record 802 of FIG. 8. In some embodiments, one tagging location is specified per ad.

In step 506, annotation server 154 obtains user IDs for the retrieved tagging locations. Annotation server 154 may search through the tagging location column 612 of location record table 600, looking for tagging locations that match the tagging locations retrieved from the ad location table. For example, if the ad ID is Ad4, annotation server 154 may search through location record table 600, and any records found with a tagging location of "ABC Market" may be retrieved. In FIG. 6, such records include record 604 and record 608. Once records with such matching tagging locations are found and retrieved from location record table 600, the user ID of each retrieved record is stored along with the tagging location and timestamp information. For example, the user ID for Bob with a timestamp of timestamp2 and the user ID for Carol with a timestamp of timestamp8 may be retrieved and stored, along with "ABC Market". These records indicate location tags associated with one or more locations that are designated by the advertiser for the ad ID. After step 506 is finished, annotation server 154 has a set of records that may be candidates for use in constructing an annotation. In the example described above, annotation server 154 has records 604 and 608 which may be used for annotation.

In step 508, annotation server 154 selects a user ID for an annotation. Annotation server 154 may initially determine one or more contacts of the user in order to select the user ID, by using the social graph table 900 of FIG. 9. The user ID for the annotation may be selected from the contacts of the user. In some embodiments, annotation server 154 selects a single user ID for use in the annotation. The annotation server may select the user ID with a timestamp that is most recent for constructing the annotation. For example, if timestamp2 is 05:00 on Jul. 4, 2007 and timestamp8 is 08:00 on Aug. 10, 2007, then the annotation server may select row 608 with Carol and timestamp8 for constructing the annotation.

In some embodiments, a weight value assigned to each user ID may be used to select the user ID for annotation. The weight value may represent a degree of affinity between the user and a contact, computed based on signals of influence received when users and contacts perform actions that demonstrate a bond or interest. For example, when a first person communicates or otherwise interacts with a second person, the weight value for the second person with respect to the first person may be increased. The weight values may also increase when one person invites the other person to interact. Thus, the greater the degree of social affinity between two users or the greater the degree of degree of social affinity of one user for other user, the greater the weight value. These weight values may be stored in a database. The user ID may be selected based on the weight value. For example, if Alice has a weight value of 0.8 with respect to Bob, and Jack has a weight value of 0.2 with respect to Bob, then Alice's user ID may be selected for the annotation, because her weight value is 0.6 higher than the weight value for Jack.

In step 510, annotation server 154 constructs the annotation. Annotation server 154 may use the user ID and tagging location to construct the annotation. Such an annotation may read, for example, as "Bob checked in at ABC Market". In other embodiments, annotation server 154 may select multiple user IDs that have the same tagging locations for use in constructing in the annotation. For example, annotation server 154 may use both records 604, 608 for constructing the annotation. Such an annotation may be, for example, "Bob and Carol checked in at ABC Market".

In an embodiment, annotation server 154 may also use a timestamp to construct the annotation. Such an annotation may read, for example, as "Bob checked in at ABC Market on Jul. 4, 2007". In some embodiments, advertisers may specify an expiration time for the timestamp. In some embodiments, the annotation may include an indication of time if an expiration time period specified by the advertiser has not passed. Thus, if annotation server 154 is selecting user Ms for annotation on Aug. 12, 2007, and the expiration period is after one month, Bob with timestamp2 will not be selected. Instead, only Carol with timestamp8 is selected, if timestamp2 is 05:00 on Jul. 4, 2007 and timestamp8 is 08:00 on Aug. 10, 2007. The annotation may indicate that the contact has made the location tag within a certain timeframe. For example, the annotation in which Carol is selected may indicate that "Carol checked in at ABC Market within the past month." In some embodiments, annotation server 154 may also randomly select a user ID for annotation. For example, if two users Bob and Alice have a similar weight value, then the annotation server 154 may randomly select a user ID for annotation.

In some embodiments, an annotation may indicate an aggregate count of the number of people that have checked in at a tagging location. Annotation server 154 may search through the location record table for tagging locations that match a specific location. In an embodiment, each ad ID is associated with one tagging location. Annotation server 154 counts the number of location records in the location record table with the matching location. The number of location records may be used to create the annotation. For example, the annotation may be "100 people checked into The Mall in the last 10 minutes".

In some embodiments, a specific geographic location is stored with each tagging location in the location record table. When an ad request is received from a user, a geographic location of the user is also received, and the geographic location of the user may be used to filter tagging locations in the aggregate count. For example, the geographic location of the user may be San Jose. San Jose may be used to filter location records of the location record table listing The Mall as the tagging location. The annotation may be "100 people in San Jose checked into The Mall in the last 10 minutes". To construct such an annotation as shown in the example, annotation server 154 searches through location record table 162 to count the number of records that have The Mall as the tagging location. The records that are not associated with San Jose and have a timestamp exceeding 10 minutes are filtered out.

In an embodiment, annotation server 154 may maintain an index of records for the location record table based on the user IDs and tagging locations. Annotation server 154 may use the index to efficiently obtain records from said location record table 162. For a tagging location associated with an ad ID derived from the ad location table, annotation server 154 may use the index to quickly identify which records of the location record table are associated with the location. In some embodiments, tagging locations may be sorted alphabetically in the index. For example, annotation server 154 may efficiently look up "ABC Market" in the alphabetically sorted index, and find user IDs Bob and Carol. The user IDs may be stored with the index and therefore retrieved in a very short amount of time. In some embodiments, the timestamps may also be added to the index information. The timestamp information may thus be quickly retrieved. In some embodiments, URLs may also be added to the index information. The URLs may thus be quickly accessible through the index.

In step 512, annotation server 154 sends the annotation to client 101. In some embodiments, a posted comment that has been location tagged by a contact can be retrieved by the annotation server using a URL and sent to client 101 for display to the user. The URL may be from an entry in the location record table. Also, a photo that has been location tagged by a contact can be retrieved using the URL stored in the location record table, and sent to client 101 for display to the user. The annotation and posted comment or photo may be received by the iframe. The annotation is then displayed on the client with or on top of the ad.

In some embodiments, annotation server 154 accesses a database to determine the designated geographic locations after accessing a database to determine one or more contacts of the user. The contacts of the user may be determined using the social graph illustrated in FIG. 9. In some embodiments, annotation server 154 accesses a database to determine the designated geographic locations before accessing a database to determine one or more contacts of the user.

To determine the designated geographic locations after accessing a database to determine one or more contacts of the user, annotation server 154 may initially access social graph table 900 of FIG. 9 to determine the contacts of a user. The ad location table 800 may be used to determine the tagging locations (e.g. designated geographic locations) of the ad selected by the ad mixer. The tagging locations may be set by advertisers. Annotation server 154 may use the location record table 600 to look up the user IDs with tagging locations at the designated geographic locations of the selected ad. The location records with the designated geographic locations as tag locations and also listing the user IDs of contacts of the user may be retrieved to form annotations that are sent to the client 101.

In at least some embodiments, the database accessed to determine one or more designated geographic locations for an ad or a content item, the database accessed to determine one or more contacts of the user, and the database accessed to determine location records corresponding to tagging actions of the user's contacts may all be the same database, or may be different databases, or any combination of databases.

In some embodiments, an annotation may display a photo that a user has taken at a particular location or some other graphic that a user associates with the particular location. For example, Alice might take a photo of a museum. Alice tags the photo with the location of the museum. The advertiser associates one or more tagging locations with an ad featuring the museum. Based on an ad ID for the ad, annotation server 154 may look up the tagging locations (e.g. designated geographic locations) for the museum, determine which candidate location records have tagging locations for the museum and were made by contacts of the user, and construct the annotation using a location record selected from the candidate location records. An annotation may thus be a display of a photo of the museum for a search result or ad featuring the museum.

Location Record Table

FIG. 6 illustrates a location record table, according to an embodiment. Location record table 600 is an example of location record table 162, with location records 602, 604, 606, and 608. Location record table 600 also has a user ID column 610, a tagging location column 612, and a timestamp column 614. In some embodiments, location record table 600 may also have other columns. The location record table may store location tags that the user makes while at some location. For example, if the user is in Hawaii, the user may make tag the Hawaii location that she is at. Information about the location tag would then be stored in the location record table. For example, one row of the location record table may be "Alice, The Mall, timestamp4". In this example, the user ID is Alice's user ID, the tagging location is "The Mall", and the timestamp is timestamp4. The user ID may be a unique identifier. For simplicity of illustration, names are displayed instead of the user IDs in FIG. 6. Alice may be at The Mall when she checks in. The timestamp4 may represent a date and time such as 05:00 on Aug. 9, 2010.

The rows of the location record table may be used in conjunction with the rows of the ad location table in order to construct annotations. The user may also tag comments that she makes or that other people make. The location tags on the comments can also be stored in location record table 600. Anything that the user shares may also be tagged. Such tags can also be stored in location record table 600. For example, the user may share a photo or an ad. The photo or the ad may be tagged with a location, and the location tag is stored in the location record table. In some embodiments, the location record may include data indicating that the location record is for a photo, an ad, or a comment.

In some embodiments, a cron job may crawl websites or other sources of location tag information to obtain location tag information. The cron job may retrieve the tag information to populate the location record table. The cron job may visit a social networking websites to obtain the data that indicates who has checked in at different locations. The cron job may analyze the metadata and the HTML tags of websites in order to retrieve the data.

In some embodiments, the location record table may have an additional column 616 with each column entry storing a URL or some other pointer or address that points to entries in a posted comments table (not illustrated) or entries in a photo table (not illustrated). The URL may also point to any other location not in a table where data regarding comments or photos are located. When the annotation is sent to the user, a posting that has been location tagged by a contact can be retrieved using the URL and sent to the client for display to the user. Also, when the annotation is sent to the user, the photo that has been location tagged by a contact can be retrieved using the URL stored in the location record table, and displayed to the user. The URL may be stored in the table when a person tagging a posted comment or a photo also provides a URL for the posted comment or picture. In some embodiments, the URL may be sent to the client instead of the actual posted comment or photo. The client may then retrieve the posted comment or photo for display.

In some embodiments, the additional column 616 may also have column entries that each point to a URL where data regarding conversions are stored and available for retrieval. For example, Alice might purchase a Brand X car at Y dealership. The car and dealership data may be stored at a location accessible by a URL. Data regarding the purchase may also be automatically sent from the car dealership to a server, and the server may enter a location record into the location record table. The location record may include user ID data for Alice, tagging location data for the car dealership's geographic location, and timestamp data for the time that Alice purchased the vehicle. The location record may include a URL that points to data regarding the purchase, such as the name of the dealership, the brand of the car, or any other information regarding the purchase transaction. In some embodiments, the location record may also contain data that indicates the location record is for a conversion event.

When the annotation is constructed from the location record, the purchase data located at and retrievable from the URL may be used for the annotation. For example, such purchase data may indicate that Alice purchased Brand X car at Y dealership. The ads for Y dealership may be associated with tagging locations that are the geographic locations of Y dealership. When the ad is served, the data regarding the purchase may be displayed as part of the annotation. For example, the annotation may read "Last week, Alice purchased Brand X car at Y dealership! Click here to view current inventory of cars at Y dealership". In some embodiments, users may opt out of allowing their purchase transaction information to be distributed or used in annotations.

Entity ID Table

FIG. 7 illustrates an entity ID table, according to an embodiment. The entity ID table 700 stores mappings of entity IDs to ad IDs, including records 702, 704, 706, 708, and 710. Also, there are columns 712, 714 for ad ID and entity ID, respectively. Each entity ID may be mapped to multiple ad IDs. Each mapping is represented as a single record in the entity ID table 700. An example of an entity is "Best Food Shop", which may be running an ad campaign with several ads Ad1, Ad4, and Ad5 as shown in FIG. 7.

Ad Location Table

FIG. 8 illustrates an ad location table, according to an embodiment. An example of the ad location table 164 is ad location table 800 depicted in FIG. 8. Ad location table 800 has five records, each record storing the ad ID of a particular ad, and a tagging location associated with that ad. Records 802, 804, 806, 808, and 810 each represent an ad location record. The ad location table may have two columns. One column, ad ID column 812, may contain an ad ID for each record. The other column, tagging location column 814, may contain tagging locations. Data for populating the ad location table may be provided by an advertiser. The rows of the ad location table may be used in conjunction with the rows of the location record table in order to construct annotations.

The ad location records may be supplied by the advertiser that is providing the ad. The advertiser may designate the locations that are associated with each ad ID. Each ad ID may map to multiple tagging locations. For example, one record 802 in the ad location table may consist of "Ad4|ABC Market". This record 802 means that the advertiser would like Ad4 to be displayed for tagging locations that are located at ABC Market. According to this record, any location tag that has a tagging location of "ABC Market" may be associated with the ad ID of "Ad4" when constructing annotations. Thus, Ad4 may be served to a user with an annotation that indicates that a contact "has been to ABC Market".

In some embodiments, an advertiser may also designate one or more locations for an entity ID. The locations associated with an entity ID may be the same as the locations specified when a user tags a post/photo or checks in. Every ad that is associated with the entity ID may then be associated with specific locations designated for the entity ID. FIG. 7 illustrates an example entity ID table that shows mappings of the entity IDs to ad IDs. The entity ID table may be used to designate multiple ads for each entity ID, and each of the ads may have multiple locations. For example, "Best Food Shop" has four ads, which are Ad1, Ad4, and Ad5. The advertiser for the Best Food Shop entity may indicate that all of the advertisements should be displayed for tagging locations of "ABC Market". Alternatively, the advertiser (such as the advertiser running a campaign for the Best Food Shop entity) may indicate that Ad1 should be displayed for tagging locations of "The Mall", and Ad4 and Ad5 should be displayed for tagging locations of "ABC market", as shown in FIG. 8. Thus, when a person tags a location such as one of the locations designated by the advertiser for the Best Food Shop entity, then an annotation may be sent to the client device that shows that the person has made a location tag at the location indicated by the tagging location column of one of the records of location record table.

Social Graph Table

FIG. 9 illustrates a social graph table, according to an embodiment. As illustrated in FIG. 9, social graph table 900 includes a name column 912 and one or more contact columns 914. For each record 902, 904, 906, 908, and 910, the contact columns indicate social contacts of the user identified in the name column. In actual implementation, in some embodiments, the name column is replaced with a user ID column. Each user or social contact is assigned a unique user ID. Also, in actual implementation, in some embodiments, the names of the contacts are each replaced with a user ID.

Opt Out

In some embodiments, users may optionally opt out of being served ads and annotations using the techniques described herein. Contacts may also opt out of using their location tags to annotate ads. Contacts may also choose to disallow the use of specific location tags for annotations. Contacts may also opt out of allowing location tags on posted comments or location tags on shared items to be used for annotations. Contacts may also selectively allow their location tags to be known only to contacts and not to be counted in aggregated statistics.

Search Results/Product Pages

In some embodiments, an annotation may be shown on any URL or entity (e.g. any content item in addition to ads). For example, the disclosed techniques can be used to annotate content items such as search results or products in a product listing page. Such an annotation may display, for example, "Alice has tagged in here" for the search result or for a store associated with a product. The search results or products may be examined in order to determine the subject matter that is being displayed in the search result or product listing. In some embodiments, the subject matter may be pre-determined or pre-specified to be associated with particular tagging locations. Information such as user IDs, timestamps, and URLs of posted comments or photos may be retrieved that are associated with tagging locations from a location record table. Annotation server may search for matching tagging locations in the location record table in order to retrieve the information to construct annotations. The information may be displayed as annotations with the search results or products.

Example Embodiments

Figure 10:
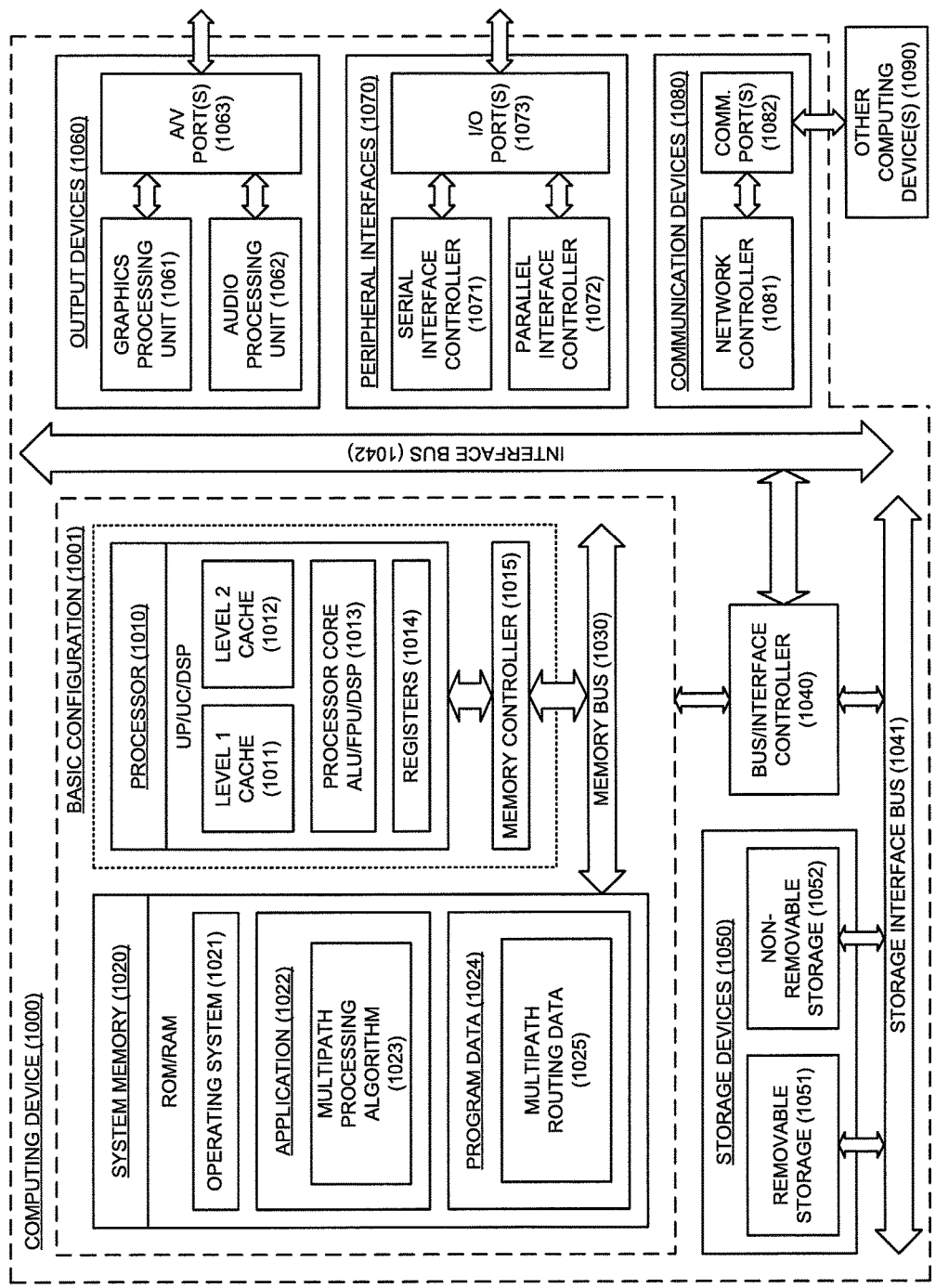
FIG. 10 is a block diagram illustrating another exemplary system upon which embodiments may be implemented.

FIG. 10 is a block diagram illustrating another exemplary system 1000 upon which embodiments may be implemented. For example, ads server 108, annotation server 154, ad mixer 150, and authentication validator 142 may be implemented with system 1000. In a very basic configuration 1001, computing device 1000 typically includes one or more processors 1010 and system memory 1020. A memory bus 1030 can be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. In some embodiments, application 1022 can be arranged to operate with program data 1024 on an operating system 1021. This described basic configuration is illustrated in FIG. 3 by those components within dashed line 1001.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output devices 1060 include a graphics processing unit 1061 and an audio processing unit 1062, which can be configured to communicate to various external devices such as a display or speakers via one or more AN ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

The invention claimed is:

1. A method performed by a data apparatus, comprising:
receiving, from a client device operated by a user, a request for a content item;
in response to said request, identifying content items available to be sent to said client device;
determining one or more designated geographic locations for each of the identified content items;
determining one or more contacts of said user, said determined one or more contacts being members of a social network of said user;
for each of the identified content items:
determining a score for the content item based on a number of tagging actions that were performed by the user's contacts at the determined designated geographic location for the identified content item, wherein said tagging actions mark an association of a person with a particular geographic location;
selecting, from the identified content items, a particular content item to be sent to the client device based on the scores;
determining that a timestamp associated with at least one of the tagging actions performed at the designated geographic location for the particular content item is within a time period specified by a provider of the particular content item, the timestamp indicating a time of the tagging action;
constructing, based on the determination that the timestamp is within the time period, an annotation that identifies at least one of the user's contacts with the tagging action corresponding to the designated geographic location and indicates the time of the tagging action based on the timestamp associated with the at least one location record; and
sending said annotation to said client device.

2. The method of claim 1, further comprising accessing a database to determine said one or more designated geographic locations after accessing said database to determine said one or more contacts of said user.

3. The method of claim 1, further comprising accessing a database to determine said one or more designated geographic locations before accessing said database to determine said one or more contacts of said user.

4. The method of claim 1, further comprising receiving a location tag, wherein the location tag includes the tagging action and a user ID of the person making the tagging action; and storing a location record with data representing said location tag in a database.

5. The method of claim 4, wherein said location record indicates a tagging action.

6. The method of claim 4, wherein said location record indicates that the person has tagged a shared content item, wherein said shared content item is an item that the person has shared with one or more people.

7. The method of claim 6, wherein said shared content item is an ad.

8. The method of claim 4, wherein said location record indicates that the person has tagged a posted comment, wherein said posted comment is a comment posted online.

9. The method of claim 1, further comprising:
calculating, based on the timestamp associated with the at least one location record, an elapsed time period since the tagging action of the user's contact; and
sending, to said client device, said annotation with an indication of the elapsed time period since the tagging action of the user's contact.

10. The method of claim 1, further comprising:
selecting an ad based on a count of location records of the user's contacts associated with said ad from a database; and
sending said ad to said client device.

11. The method of claim 1, further comprising:
increasing an ad score for an ad based on a count of location records of the user's contacts associated with said ad from a database; and
selecting said ad to be sent to said client device based on said increased ad score.

12. The method of claim 4, wherein an ad score for an ad is increased based on a count of a number of the user's contacts that has checked in at a location associated with said location tag; and
wherein constructing said annotation for said particular content item further comprises constructing said annotation to indicate said count of said number of the user's contacts that have checked in at said location.

13. The method of claim 1, further comprising:
maintaining an index for a table of location records based on user IDs and tagging locations; and wherein accessing a database is performed using said index to access said table.

14. The method of claim 4, further comprising:
using a cron job to crawl web sites or other sources of location tag information to obtain location tag information; and
populating a database using said location tag information.

15. The method of claim 4, wherein said location record indicates the person has checked in at a location or indicates the person has performed a conversion event.

16. The method of claim 4, wherein said location record contains a URL for a photo or for conversion data indicating the person has performed a conversion event.

17. An apparatus, comprising:
one or more processors,
a computer-readable medium coupled to said one or more processors having instructions stored thereon that, when executed by said one or more processors, cause said one or more processors to perform operations comprising:
receiving, from a client device operated by a user, a request for a content item;
in response to said request, identifying content items available to be sent to said client device;
determining one or more designated geographic locations for each of the identified content items;
determining one or more contacts of said user, said determined one or more contacts being members of a social network of said user;
for each of the identified content items:
determining a score for the content item based on a number of tagging actions that were performed by the user's contacts at the determined designated geographic location for the identified content item, wherein said tagging actions mark an association of a person with a particular geographic location;
selecting, from the identified content items, a particular content item to be sent to the client device based on the scores;
determining that a timestamp associated with at least one of the tagging actions performed at the designated geographic location for the particular content item is within a time period specified by a provider of the particular content item, the timestamp indicating a time of the tagging action;

constructing, based on the determination that the timestamp is within the time period, an annotation that identifies at least one of the user's contacts with the tagging action corresponding to the designated geographic location and indicates the time of the tagging action based on the timestamp associated with the at least one location record; and sending said annotation to said client device.

18. The apparatus of claim 17, wherein said computer-readable medium coupled to said one or more processors has further instructions stored thereon that, when executed by said one or more processors, cause said one or more processors to perform operations further comprising:

accessing a database to determine said one or more designated geographic locations after accessing said database to determine said one or more contacts of said user.

19. The apparatus of claim 17, wherein said computer-readable medium coupled to said one or more processors has further instructions stored thereon that, when executed by said one or more processors, cause said one or more processors to perform operations further comprising:

accessing a database to determine said one or more designated geographic locations before accessing said database to determine said one or more contacts of said user.

20. The apparatus of claim 17, wherein said computer-readable medium coupled to said one or more processors has further instructions stored thereon that, when executed by said one or more processors, cause said one or more processors to perform operations further comprising:

receiving a location tag, wherein the location tag includes the tagging action and a user ID of the person making the tagging action; and storing a location record with data representing said location tag in a database.

21. The apparatus of claim 17, wherein said location record indicates a tagging action.

22. The apparatus of claim 20, wherein said location record indicates that the person has tagged a shared content item, wherein said shared content item is an item that the person has shared with one or more people.

23. The apparatus of claim 22, wherein said shared content item is an ad.

24. The apparatus of claim 20, wherein said location record indicates that the person has tagged a posted comment, wherein said posted comment is a comment posted online.

25. The apparatus of claim 17, wherein said computer-readable medium coupled to said one or more processors has further instructions stored thereon that, when executed by said one or more processors, cause said one or more processors to perform operations further comprising:

calculating, based on the timestamp associated with the at least one location record, an elapsed time period since the tagging action of the user's contact; and sending, to said client device, said annotation with an indication of the elapsed time period since the tagging action of the user's contact.

26. The apparatus of claim 17, wherein said computer-readable medium coupled to said one or more processors has further instructions stored thereon that, when executed by said one or more processors, cause said one or more processors to perform operations further comprising:

selecting an ad based on a count of location records of the user's contacts associated with said ad from a database; and sending said ad to said client device.

27. The apparatus of claim 17, wherein said computer-readable medium coupled to said one or more processors has further instructions stored thereon that, when executed by said one or more processors, cause said one or more processors to perform operations further comprising:

increasing an ad score for an ad based on a count of location records of the user's contacts associated with said ad from a database; and selecting said ad to be sent to said client device based on said increased ad score.

28. The apparatus of claim 20, wherein an ad score for an ad is increased based on a count of a number of the user's contacts that has checked in at a location associated with said location tag; and wherein the instructions for constructing said annotation for said particular content item further comprises instructions for constructing said annotation to indicate said count of said number of the user's contacts that have checked in at said location.

29. The apparatus of claim 17, wherein said computer-readable medium coupled to said one or more processors has further instructions stored thereon that, when executed by said one or more processors, cause said one or more processors to perform operations further comprising:

maintaining an index for a table of location records based on user IDs and tagging locations; and wherein accessing a database is performed using said index to access said table.

30. The apparatus of claim 17, wherein said computer-readable medium coupled to said one or more processors has further instructions stored thereon that, when executed by said one or more processors, cause said one or more processors to perform operations further comprising:

using a cron job to crawl web sites or other sources of location tag information to obtain location tag information; and populating a database using said location tag information.

31. The apparatus of claim 20, wherein said location record indicates the person has checked in at a location or indicates the person has performed a conversion event.

32. The apparatus of claim 20, wherein said location record contains a URL for a photo or for conversion data indicating the person has performed a conversion event.

33. A non-transitory computer-readable medium coupled to one or more processors having instructions stored thereon that, when executed by said one or more processors, causes said one or more processors to perform operations comprising:

receiving, from a client device operated by a user, a request for a content item;

in response to said request, identifying content items available to be sent to said client device;

determining one or more designated geographic locations for each of the identified content items;

determining one or more contacts of said user, said determined one or more contacts being members of a social network of said user;

for each of the identified content items:
  determining a score for the content item based on a number of tagging actions that were performed by the user's contacts at the determined designated geographic location for the identified content item, wherein said tagging actions mark an association of a person with a particular geographic location;

selecting, from the identified content items, a particular content item to be sent to the client device based on the scores;

determining that a timestamp associated with at least one of the tagging actions performed at the designated geographic location for the particular content item is within a time period specified by a provider of the particular content item, the timestamp indicating a time of the tagging action;

constructing, based on the determination that the timestamp is within the time period, an annotation that identifies at least one of the user's contacts with the tagging action corresponding to the designated geographic location and indicates the time of the tagging action based on the timestamp associated with the at least one location record; and sending said annotation to said client device.

34. The computer-readable medium of claim 33, wherein said computer-readable medium coupled to said one or more processors has further instructions stored thereon that, when executed by said one or more processors, cause said one or more processors to perform operations further comprising:
accessing a database to determine said one or more designated geographic locations after accessing said database to determine said one or more contacts of said user.

35. The computer-readable medium of claim 33, wherein said computer-readable medium coupled to said one or more processors has further instructions stored thereon that, when executed by said one or more processors, cause said one or more processors to perform operations further comprising:
accessing a database to determine said one or more designated geographic locations before accessing said database to determine said one or more contacts of said user.

36. The computer-readable medium of claim 33, wherein said computer-readable medium coupled to said one or more processors has further instructions stored thereon that, when executed by said one or more processors, cause said one or more processors to perform operations further comprising:
receiving a location tag, wherein the location tag includes the tagging action and a user ID of the person making the tagging action; and storing a location record with data representing said location tag in a database.

37. The computer-readable medium of claim 36, wherein said location record indicates a tagging action.

38. The computer-readable medium of claim 36, wherein said location record indicates that the person has tagged a shared content item, wherein said shared content item is an item that the person has shared with one or more people.

39. The computer-readable medium of claim 38, wherein said shared content item is an ad.

40. The computer-readable medium of claim 36, wherein said location record indicates that the person has tagged a posted comment, wherein said posted comment is a comment posted online.

41. The computer-readable medium of claim 33, wherein said computer-readable medium coupled to said one or more processors has further instructions stored thereon that, when executed by said one or more processors, cause said one or more processors to perform operations further comprising:
calculating, based on the timestamp associated with the at least one location record, an elapsed time period since the tagging action of the user's contact; and sending, to said client device, said annotation with an indication of the elapsed time period since the tagging action of the user's contact.

42. The computer-readable medium of claim 33, wherein said computer-readable medium coupled to said one or more processors has further instructions stored thereon that, when executed by said one or more processors, cause said one or more processors to perform operations further comprising:
selecting an ad based on a count of location records of the user's contacts associated with said ad from a database; and sending said ad to said client device.

43. The computer-readable medium of claim 33, wherein said computer-readable medium coupled to said one or more processors has further instructions stored thereon that, when executed by said one or more processors, cause said one or more processors to perform operations further comprising:
increasing an ad score for an ad based on a count of location records of the user's contacts associated with said ad from a database; and selecting said ad to be sent to said client device based on said increased ad score.

44. The computer-readable medium of claim 36, wherein an ad score for an ad is increased based on a count of a number of the user's contacts that has checked in at a location associated with said location tag; and
wherein the instructions for constructing said annotation for said particular content item further comprises instructions for constructing said annotation to indicate said count of said number of the user's contacts that have checked in at said location.

45. The computer-readable medium of claim 33, wherein said computer-readable medium coupled to said one or more processors has further instructions stored thereon that, when executed by said one or more processors, cause said one or more processors to perform operations further comprising:
maintaining an index for a table of location records based on user IDs and tagging locations; and wherein accessing a database is performed using said index to access said table.

46. The computer-readable medium of claim 33, wherein said computer-readable medium coupled to said one or more processors has further instructions stored thereon that, when executed by said one or more processors, cause said one or more processors to perform operations further comprising:
using a cron job to crawl web sites or other sources of location tag information to obtain location tag information; and populating a database using said location tag information.

47. The computer-readable medium of claim 36, wherein said location record indicates the person has checked in at a location or indicates the person has performed a conversion event.

48. The computer-readable medium of claim 36, wherein said location record contains a URL for a photo or for conversion data indicating the person has performed a conversion event.

49. The method of claim 1, wherein the at least one location record includes a first location record and a second location record, the first location record corresponding to a tagging action of a first contact of the user at the determined one or more designated geographic locations, and the second location record corresponding to a tagging action of a second contact of the user at the determined one or more designated geographic locations, and further comprising:
comparing a timestamp associated with the first location record to a timestamp associated with the second location record, the timestamp associated with the first location record indicating a time of the tagging action of the first contact of the user and the timestamp associated with the second location record indicating a time of the tagging action of the second contact of the user;

determining, based on the comparison, that an elapsed time period since the tagging action of the first contact of the user is greater than an elapsed time period since the tagging action of the second contact of the user;

constructing an annotation for the particular content item that identifies the second contact of the user with the tagging action corresponding to the second location record and indicates the time of the tagging action based on the timestamp associated with the second location record; and sending said annotation to said client device.

50. The method of claim 49, further comprising:

constructing an annotation for the particular content item that identifies the first contact of the user with the tagging action corresponding to the first location record and the second contact of the user with the tagging action corresponding to the second location record, and indicates the elapsed time periods since the tagging actions of the first and second contacts of the user; and sending said annotation to said client device.

51. The apparatus of claim 17, wherein the at least one location record includes a first location record and a second location record, the first location record corresponding to a tagging action of a first contact of the user at the determined one or more designated geographic locations, and the second location record corresponding to a tagging action of a second contact of the user at the determined one or more designated geographic locations, and wherein said computer-readable medium coupled to said one or more processors has further instructions stored thereon that, when executed by said one or more processors, cause said one or more processors to perform operations further comprising:

comparing a timestamp associated with the first location record to a timestamp associated with the second location record, the timestamp associated with the first location record indicating a time of the tagging action of the first contact of the user and the timestamp associated with the second location record indicating a time of the tagging action of the second contact of the user;

determining, based on the comparison, that an elapsed time period since the tagging action of the first contact of the user is greater than an elapsed time period since the tagging action of the second contact of the user;

constructing an annotation for the particular content item that identifies the second contact of the user with the tagging action corresponding to the second location record and indicates the time of the tagging action based on the timestamp associated with the second location record; and sending said annotation to said client device.

52. The apparatus of claim 51, wherein said computer-readable medium coupled to said one or more processors has further instructions stored thereon that, when executed by said one or more processors, cause said one or more processors to perform operations further comprising:

constructing an annotation for the particular content item that identifies the first contact of the user with the tagging action corresponding to the first location record and the second contact of the user with the tagging action corresponding to the second location record, and indicates the elapsed time periods since the tagging actions of the first and second contacts of the user; and sending said annotation to said client device.

53. The computer-readable medium of claim 33, wherein the at least one location record includes a first location record and a second location record, the first location record corresponding to a tagging action of a first contact of the user at the determined one or more designated geographic locations, and the second location record corresponding to a tagging action of a second contact of the user at the determined one or more designated geographic locations, and wherein said computer-readable medium coupled to said one or more processors has further instructions stored thereon that, when executed by said one or more processors, cause said one or more processors to perform operations further comprising:

comparing a timestamp associated with the first location record to a timestamp associated with the second location record, the timestamp associated with the first location record indicating a time of the tagging action of the first contact of the user and the timestamp associated with the second location record indicating a time of the tagging action of the second contact of the user;

determining, based on the comparison, that an elapsed time period since the tagging action of the first contact of the user is greater than an elapsed time period since the tagging action of the second contact of the user;

constructing an annotation for the particular content item that identifies the second contact of the user with the tagging action corresponding to the second location record and indicates the time of the tagging action based on the timestamp associated with the second location record; and sending said annotation to said client device.

54. The computer-readable medium of claim 53, wherein said computer-readable medium coupled to said one or more processors has further instructions stored thereon that, when executed by said one or more processors, cause said one or more processors to perform operations further comprising:

constructing an annotation for the particular content item that identifies the first contact of the user with the tagging action corresponding to the first location record and the second contact of the user with the tagging action corresponding to the second location record, and indicates the elapsed time periods since the tagging actions of the first and second contacts of the user; and sending said annotation to said client device.

* * * * *